US010210562B2

(12) United States Patent
Dey et al.

(10) Patent No.: US 10,210,562 B2
(45) Date of Patent: Feb. 19, 2019

(54) METHOD, MEDIUM, AND SYSTEM FOR REAL-TIME PRICING THROUGH SMART-PRICE-TAGS

(71) Applicant: International Business Machines Corporation, Armonk, NY (US)

(72) Inventors: Kuntal Dey, New Delhi (IN); Vijay Ekambaram, Tamilnadu (IN); Seema Nagar, Bangalore (IN); Swati Rallapalli, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 15/259,429

(22) Filed: Sep. 8, 2016

(65) Prior Publication Data

US 2018/0068375 A1  Mar. 8, 2018

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0633* (2013.01); *G06Q 30/02* (2013.01)

(58) Field of Classification Search
CPC ............ G06Q 30/0633; G06Q 30/02
See application file for complete search history.

(56) References Cited

U.S. PATENT DOCUMENTS

| 5,151,684 A | 9/1992 | Johnsen |
| 6,703,934 B1 | 3/2004 | Nijman et al. |
| 6,924,781 B1* | 8/2005 | Gelbman ............ G06F 3/1454 340/10.6 |
| 9,092,814 B2* | 7/2015 | Timm ................. G04F 1/005 |
| 2002/0109593 A1* | 8/2002 | Swartzel ............ G06Q 10/087 340/540 |
| 2009/0313587 A1* | 12/2009 | Goodwin ............ G06F 1/1616 715/863 |

(Continued)

FOREIGN PATENT DOCUMENTS

| CN | 102802049 | 11/2012 |
| CN | 103226782 | 7/2013 |
| CN | 105139234 | 12/2015 |

OTHER PUBLICATIONS appcrawlr.com., "10 Best Apps for Shake to Unlock", http://appcrawlr.com/android-apps/best-apps-shake-to-unlock, last visited on Mar. 30, 2016, pp. 1-5. (Year: 2016).*

Shake, "Shake—Android Apps on Google Play", https://play.google.com/store/apps/details?id=com.adl.appshaker&hl=en, last visited on Mar. 30, 2016, pp. 1-3.

Mobile Communication Media, "Shake Messenger—What is Shake Messenger", http://www.shakemessenger.com/, last visited on Mar. 30, 2016, pp. 1-5.

(Continued)

*Primary Examiner* — Matthew E Zimmerman
(74) *Attorney, Agent, or Firm* — Fleit Gibbons Gutman Bongini Bianco PL; Donna Flores

(57) ABSTRACT

Various embodiments determine a sale price of an item via a smart price tag associated with the item. In one embodi- (Continued)

ment, the smart price tag is detected as being shaken. Responsive to detecting the smart price tag as being shaken, a request for a current sale price of the item for sale is sent to a back end price server. The current sale price of the item for sale is received from the back end price server and displayed for a predetermined period of time. The current sale price may be displayed on the smart price tag or a separate display sign. The current price is displayed until expiration of a predetermined period of time unless a lock request is detected which locks the price of the item for sale at the current sale price. If a price unlock button is pressed, the sale price of the item is unlocked.

19 Claims, 4 Drawing Sheets

(56) References Cited

U.S. PATENT DOCUMENTS

| | | |
|---|---|---|
| 2010/0100506 A1 | 4/2010 | Marot |
| 2011/0289023 A1* | 11/2011 | Forster .............. G06K 19/07703 705/500 |
| 2012/0166261 A1 | 6/2012 | Velusamy et al. |
| 2013/0187850 A1* | 7/2013 | Schulz ..................... G06F 3/03 345/156 |
| 2013/0275261 A1 | 10/2013 | Yoked |
| 2016/0063529 A1 | 3/2016 | Roeding et al. |
| 2017/0169264 A1* | 6/2017 | Britt .................. G06K 7/10386 |

OTHER PUBLICATIONS

Shakeshake! for Sayhi, "ShakeShake! forSayHi—Android Apps on Google Play", https://play.google.com/store/apps/details?id=com.sayhi.plugin.shakeshake, last visited on Mar. 30, 2016, pp. 1-3.

Shake Me, "Shake Me—Android Apps on Google Play", https://play.google.com/store/apps/details?id=polis.app.shakeme&hl=en, last visited on May 13, 2016, pp. 1-6.

Shake Screen on Off Free, "Shake Screen on Off Free—Android Apps on Google Play", https://play.google.com/store/apps/details?id=shake.screen.on.off&hl=en, last visited on Mar. 30, 2016, pp. 1-4.

Shake to Unlock, "Shake to Unlock—Android Apps on Google Play", https://play.google.com/store/apps/details?d=com.ndtsoft.shaketounlock&hl=en, last visited on Mar. 30, 2016, pp. 1-4.

appcrawlr.com., "10 Best Apps for Shake to Unlock", http://appcrawlr.com/android-apps/best-apps-shake-to-unlock, last visited on Mar. 30, 2016, pp. 1-5.

Shake for Help, "Shake for Help—Stop Bullying—Android Apps on Google Play", https://play.google.com/store/apps/details?id=com.shakeforhelp&hl=en, last visited on May 13, 2016, pp. 1-5.

dailymail.com., "Out of battery? Just give your phone a quick shake", http://www.dailymail.co.uk/sciencetech/article-2232830/Out-battery-Just-phone-quick-shake-charge.html, Nov. 14, 2012, pp. 1-3.

\* cited by examiner

METHOD, MEDIUM, AND SYSTEM FOR REAL-TIME PRICING THROUGH SMART-PRICE-TAGS

BACKGROUND

The present disclosure generally relates to obtaining real time pricing, and more particularly to obtaining real-time pricing using smart-price-tags.

The prices of items for sale in retail stores are typically fixed (i.e. static). In some cases, such as during a sale, a display sign or tag may state a current discount for a product, which may be applied to the product upon checkout. However, the discounted price may not updated or is incorrect at the cash register, which can result in a disgruntled customer(s) while time is spent price checking or if the customer overpays, due to not immediately noticing the error.

There are known ways of delivering en-mass and personalized coupons offering discounts to customers. However, these methods are generally push-based; that is, if the store does not push the offer, the customer will not receive the coupon or pricing. Further, if a customer specifically wants to know about a product, they have no way of obtaining a coupon without using additional devices (such as a mobile phone/browser, etc.)

In addition, associating a product with the customer's "wants" and then searching often turns out to be a difficult task, which often results in no available coupon/discount for the product associated at all. Sporadic pull-based pricing may be available in some retail stores where separate price check counters or stations are installed, but the users need to walk to the counter or station to scan the product and get the price.

SUMMARY

In various embodiments, a smart price tag, a computer program product and computer-implemented methods for determining a sale price of an item via a smart price tag associated with the item are disclosed. The methods comprise detecting the smart price tag is being shaken, and in response to detecting the smart price tag as being shaken, sending a request for a current sale price of the item to a back end price server. The current sale price of the item is received from the back end price server.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Embodiments of the present invention provide a system and associated methods to obtain real-time prices of products in physical stores, in response to a price quotation pull request of a given product expressed by a customer using a smart price tag attached to the product, where the system knows which product the smart price tag is associated with. The smart price tag may use motion detection (such as, shake detection) so that the customer makes a pull request by performing certain gestures directly on the smart price tag or the product (such as shaking the smart price tag itself or shaking the product such that the smart price tag also shakes).

Operating Environment

Figure 1:
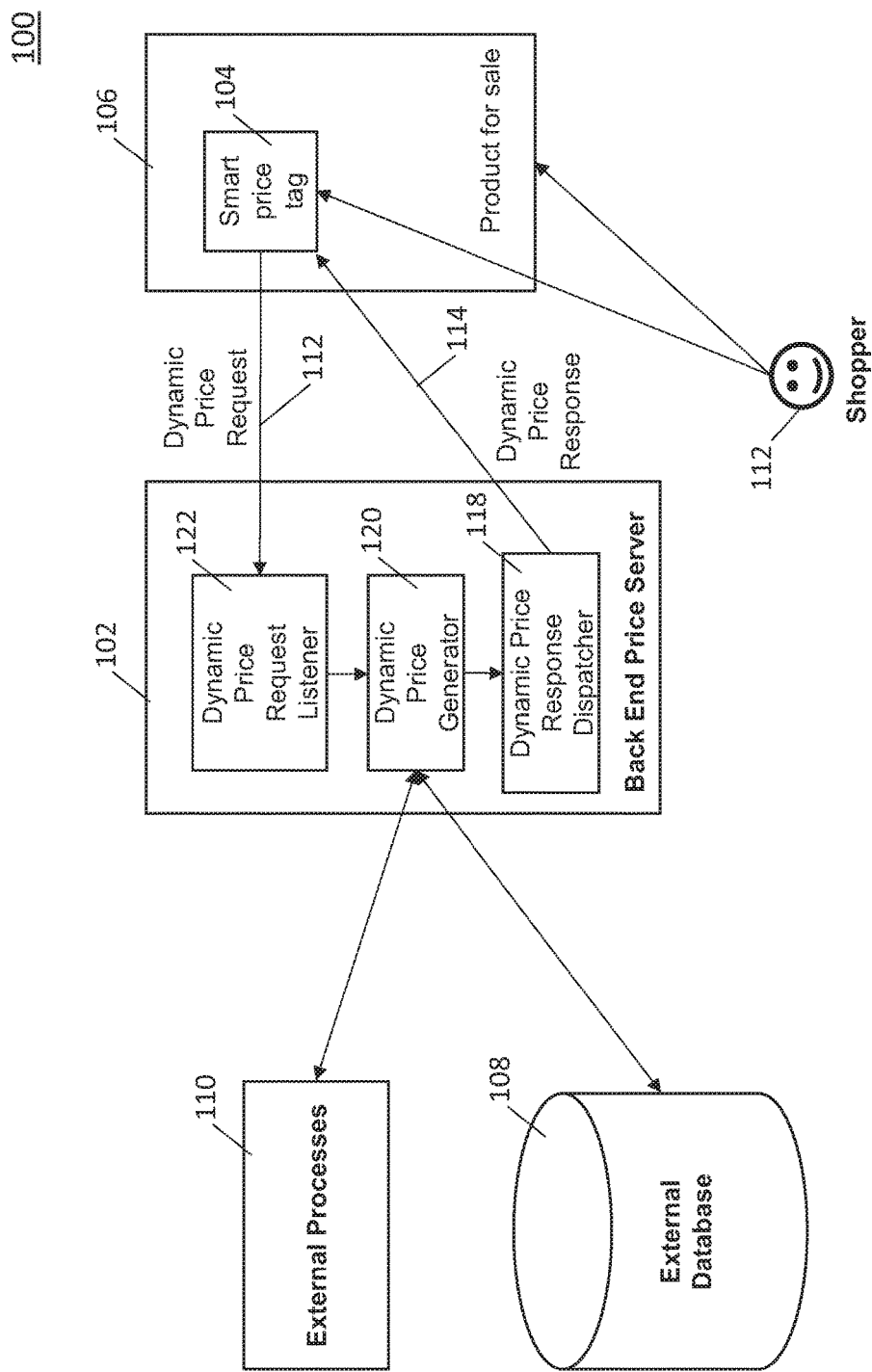
FIG. 1 is a block diagram illustrating one example of an operating environment comprising a pricing system according to one embodiment of the present invention.

FIG. 1 shows one example of an operating environment of a price checking system 100 for providing real-time price quotes and discount offers for a specific item for sale according to one embodiment. The operating environment 100 comprises a back end price server 102, a plurality of smart price tags 104 (one shown) and, optionally, an external database 108 and/or external processes 110 for dynamic price generation. Each smart price tag 104 is a small electronic device attached to a product for sale 106 by a mechanism such as a physical hook, a security pin, a sticky surface, a locking tag, etc. The attachment mechanism may be operably coupled with a tamper sensor to verify that the smart price tag 104 may only be attached to the specific associated item for sale 106 and detect if the smart price tag 104 is removed or tampered with. If such tampering or removal is detected, the smart price tag 104 may deactivate itself and/or send a notification to the back end price server 102 for reporting purposes.

Figure 2:
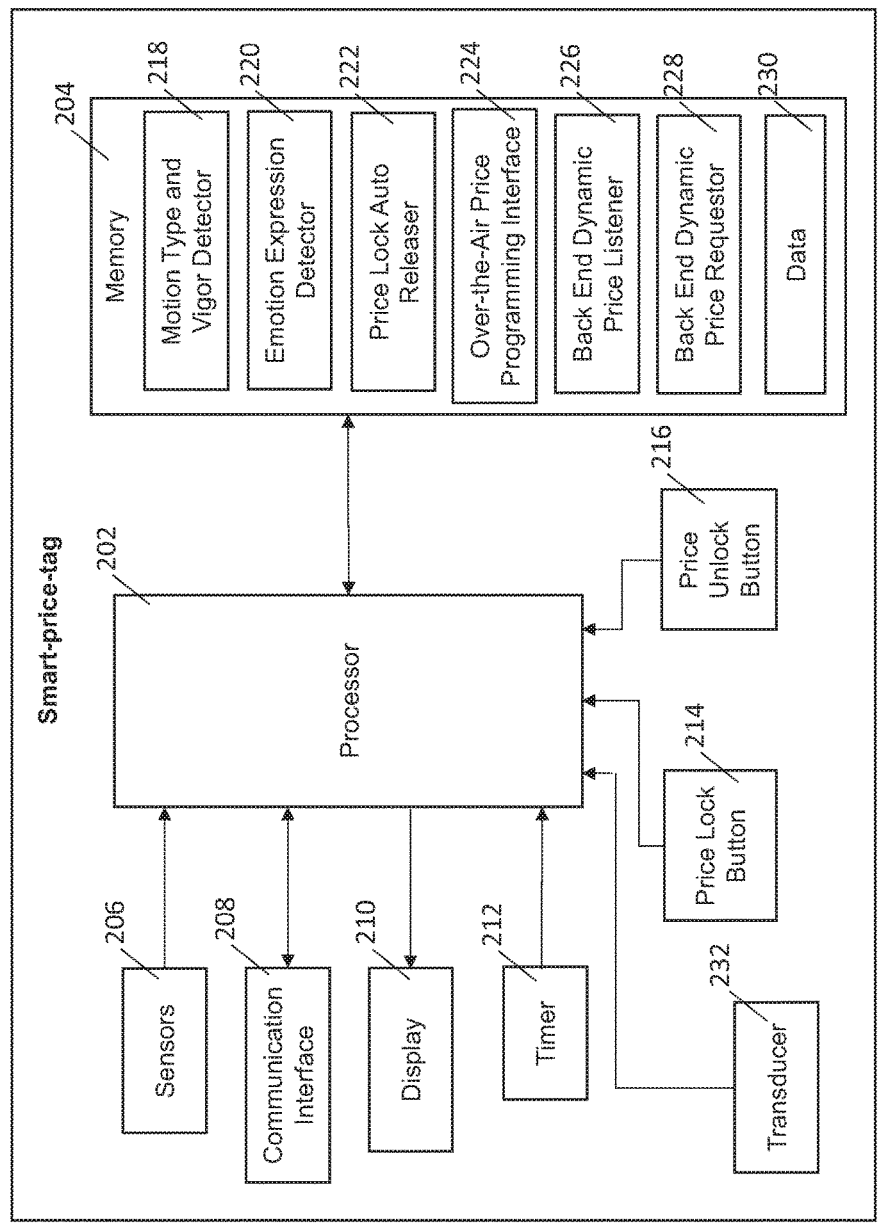
FIG. 2 is a block diagram of one example of a smart price tag used in accordance with one example of the present invention.

A detailed block diagram of an example smart price tag is shown in FIG. 2 in accordance with one example of the present invention. The smart price tag 104 includes a processor 202 operably coupled to a memory 204, one or more sensors 206 (such as an accelerometer, a gyroscope, etc.), a communication interface 208, a display 210, a timer 212, two buttons (a price lock button 214 and a price unlock button 216) and an optional transducer 232 (such as a speaker, vibrator, siren, buzzer, etc.).

The communication interface 208 allows the smart price tag 104 to communicate with the back end price server 102 using short range communication protocols (such as Wi-Fi, Bluetooth, etc.).

The display 210 may be a simple low-power light emitting diode (LED) display, a liquid crystal display (LCD) or other type of display.

The memory 204 stores various elements for performing the functions of the methods discussed herein (such as a motion type and vigor detector 218, an emotion expression detector 220, a price lock auto releaser 222, an over-the-air programming interface 224, a back end dynamic price listener 226 and a back end dynamic price requestor 228) as well as accompanying data 230. The over-the air programming interface 224 allows the smart price tag 104 to be logically associated with a specific item for sale 106.

When a shopper 112 wishes to request a price check for a particular item, the shopper 112 simply shakes the product for sale which has a smart price tag 104 attached, or shakes the smart price tag 104 itself. The smart price tag's 204 motion sensor 206 detects the shaking motion and characterizes the motion using the motion type and vigor detector 218. If the shaking motion matches certain predetermined characteristics, which are described in more detail below, the back end dynamic price requestor 228 sends a dynamic price request 112 to a dynamic price request listener 122 of the back end price server 102 via the communication interface 208. A dynamic price generator 120, which may be in communication with the external database 108 and various external processes 110 for dynamic price generation, generates a price for the product for sale 106 corresponding to the requesting smart price tag 104 which is only valid for a predetermined period of time unless "locked in" at the smart price tag 104 by pressing the price lock button 214. The dynamic price response dispatcher 118 sends a dynamic price response 114, including the generated price, back to the smart price tag 104. The smart price tag 104 receives the dynamic price response 114 at the back end dynamic price listener 226 via the communication interface 208.

The smart price tag 104 displays the current price on the display 210 for a predetermined period of time (e.g., one minute). The customer may also have the option to lock in the price by pressing the price lock button 214 which sets the price of the item until checkout, expiration of a second predetermined time (e.g., one hour), or until the price unlock button 216 is pressed. After the price lock auto releaser 222 determines that the offered price is no longer valid, a new price may be requested by shaking the object again.

Figure 3:
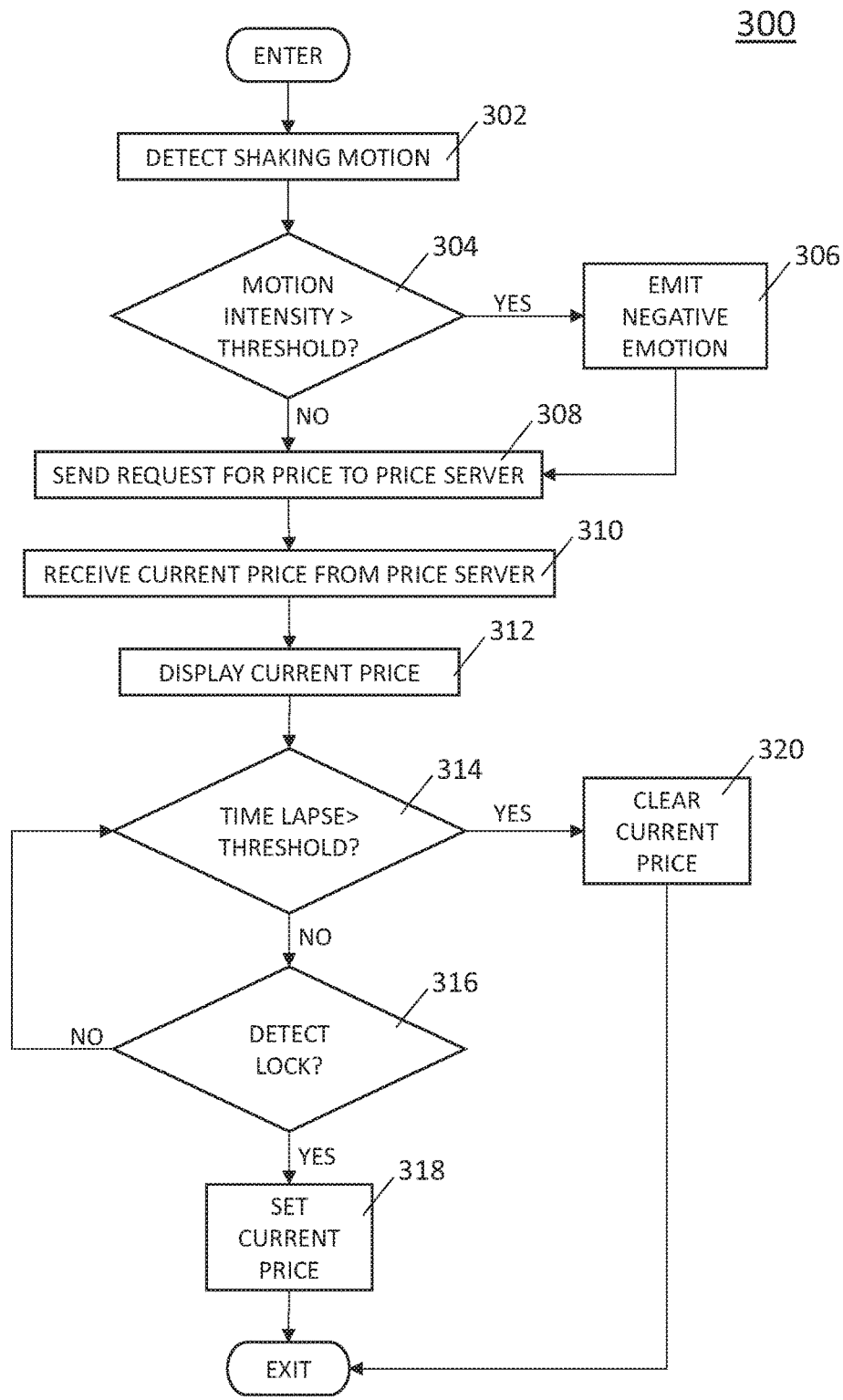
FIG. 3 is an operational flow diagram illustrating one process of receiving a price of an item for sale using the pricing system of FIG. 1 according to one embodiment of the present invention.

FIG. 3 is an operational flowchart 300 describing a method of requesting a current price of an item for sale 106 attached to and associated with a smart price tag 104 according to one embodiment of the present invention. Beginning in step 302, the sensor 206, operating in conjunction with the motion type and vigor detector 218 detects a shaking motion (i.e. detects that the smart price tag 104 is being shaken). It should be noted that the intensity of the shaking motion should be above a first predetermined threshold level in order to indicate actual shaking. However, if the motion intensity is greater than a second predetermined level, in step 304, there is a greater likelihood that the smart price tag 104 could be damaged by the vigor of the shaking. Thus, the smart price tag 104 may voice its "objection" to the degree of shaking by emitting, in step 306, a negative emotion (such as by sounding a warning through the transducer 232, displaying a warning message on the display 210, vibrating, etc.). It should be noted that the second predetermined intensity threshold is greater than the first predetermined threshold.

In step 308, the smart price tag 104 sends a dynamic price request 112 to the back end price server 102. The back end price server 102 determines a current price for the attached item of sale based on a number of factors. For example, the item of sale may be associated with a default or nominal base price, but may be adjusted up or down according to a number of factors. The price may be adjusted based on the current supply and demand of the item for sale 106 based on a given calendar day, during a given time of year or season, for a particular time of day, given crowd levels in the store, given online competition, given manufacturing/wholesale purchasing and warehousing costs, given other expenses, etc. For example, the price may be increased as the current in-store supply is diminished if the item is awaiting an expected incoming shipment; however, the price could also be decreased as the current in-store supply levels decrease if the item is marked for clearance. Various external methodologies may be used to find the best pricing of the product to jointly optimize store profitability and customer affordability.

The smart price tag 104 receives, in step 310, the current price for the attached item for sale 106 and displays, in step 312, the current price on the display 210 for a first predetermined period of time (e.g., one minute, 5 minutes, etc.). The current price is valid for the item for sale for a second predetermined period of time (e.g., one hour, thirty minutes, fifteen minutes, etc.) or for a longer duration if the user locks in the price. Thus, if the time lapsed since the smart price tag 104 has received the current dynamic price is less than the second predetermined period of time, in step 314, the smart price tag 316 maintains the current price. If the smart price tag 104 detects, in step 316, a lock request (e.g., user presses the price lock button 214 within the second predetermined time), the price of the item is locked (i.e. "set"), in step 318, at the current price level until the customer checks out, the smart price tag 104 detects the price unlock 216 button has been pressed, or a third predetermined period of time has passed (e.g., six hours, 24 hours) in which it can reasonably be assumed that the customer no longer desires to purchase the item. If the price lock button 214 is not pressed within the second predetermined period of time, in step 314, the current price is cleared, in step 320, and a new price will be generated when a customer shakes the item/smart price tag again.

In an alternative embodiment, the current sale price of the item may also (or alternatively) be communicated to an operably coupled display, separate from the smart tag, e.g., a display on the user's mobile device, or a smart price tag display sign (not shown). In some embodiments, the smart price tag display sign is located near the item for sale, and is such that the display may be shared among multiple smart price tags. The smart price tag display sign is in communication with the back end price server 102 and displays the current price of the item in response to the customer shaking the smart price tag 104. The price is displayed for a predetermined period of time so that the customer can read the display sign, then the current price of the item disappears from the display in the interest of making way for other items to be shaken and prices displayed on the shared display sign. Optionally, the smart price tag display sign may include the price lock button 214 and the price unlock button 216 so that the customer may lock the price of the item at the smart price tag display sign.

By implementing the smart price tag system 100, a retail store is able to collect, aggregate and analyze real-time user-interest data to more intelligently set prices. The collected data may be used to generate reports and feedback to detail how many customers were interested in the product and optimize a specific price point for which customers are willing to purchase specific items.

Sample Use Scenario

In a sample usage scenario, Vijay likes a certain water bottle and shakes the bottle. The smart-price-tag, secured to the bottle, experiences the shaking and issues a query to the back end price server requesting the price of the bottle. The price shown on the smart price tag display is $1. Vijay presses the "lock" button to lock the price and picks the bottle up.

However, later in the same shopping session, he sees a water bottle made of fiber glass and chooses to replace the one he locked. He similarly tries to find the price of the fiber glass bottle by shaking, and discovers that bottle is $2. He locks the price of the fiber glass bottle and picks that bottle up. He also unlocks the price of the other bottle and returns that bottle to the shelf.

Vijay later decides that he will be benefitted at home (easier home logistics) by picking up both the bottles, and just one fiber glass bottle will be fine—the other bottle being an ordinary one will be acceptable. He goes back to the first bottle and again tries to find the price; however, he finds the new price of the original bottle to be $1.50 (i.e. the backend server has chosen to increase the price as quite a few other similar bottles have been sold within this time and the store currently has more customers).

Back End Price Server

Figure 4:
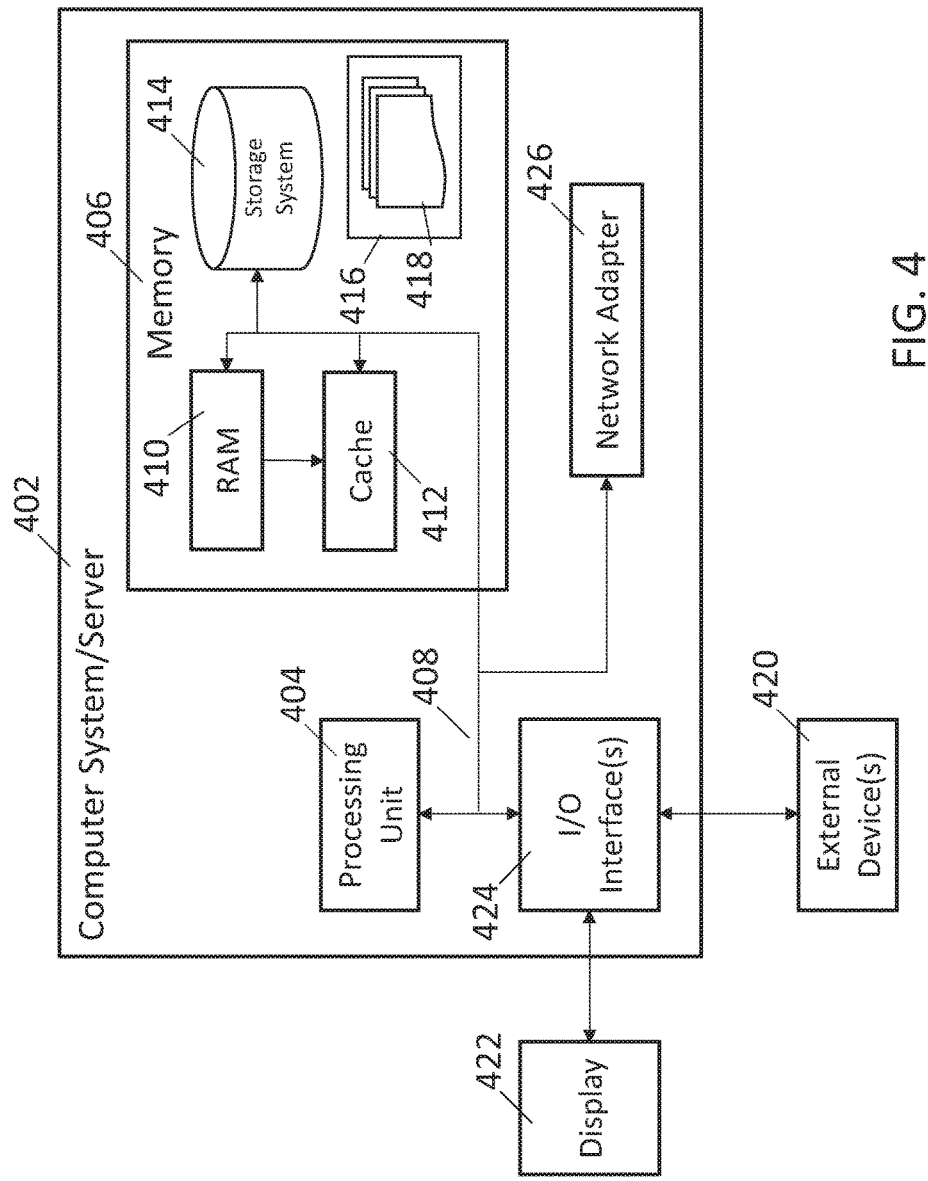
FIG. 4 is a block diagram of one example of a back end price server according to one embodiment of the present invention.

Referring now to FIG. 4, this figure is a block diagram illustrating an information processing system that can be utilized in embodiments of the present invention. The information processing system 402 is based upon a suitably configured processing system configured to implement one or more embodiments of the present invention (e.g., price checking system 100). Any suitably configured processing system can be used as the information processing system 402 in embodiments of the present invention. The components of the information processing system 402 can include, but are not limited to, one or more processors or processing units 404, a system memory 406, and a bus 408 that couples various system components including the system memory 406 to the processor 404.

The bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 4, the main memory 406 may include dynamic price request listener 118, dynamic price generator 120 and dynamic price response generator 122 shown in FIG. 1. One or more of these components can reside within the processor 404, or be a separate hardware component. The system memory 406 can also include computer system readable media in the form of volatile memory, such as random access memory (RAM) 410 and/or cache memory 412. The information processing system 402 can further include other removable/non-removable, volatile/non-volatile computer system storage media. By way of example only, a storage system 414 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 408 by one or more data media interfaces. The memory 406 can include at least one program product having a set of program modules that are configured to carry out the functions of an embodiment of the present invention.

Program/utility 416, having a set of program modules 418, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of embodiments of the present invention.

The information processing system 402 can also communicate with one or more external devices 420 (such as a keyboard, a pointing device, a display 422, etc.); one or more devices that enable a user to interact with the information processing system 402; and/or any devices (e.g., network card, modem, etc.) that enable computer system/server 402 to communicate with one or more other computing devices. Such communication can occur via I/O interfaces 424. Still yet, the information processing system 402 can communicate with one or more networks such as a local area network (LAN), a general wide area network (WAN), and/or a public network (e.g., the Internet) via network adapter 426. As depicted, the network adapter 426 communicates with the other components of information processing system 402 via the bus 408. Other hardware and/or software components can also be used in conjunction with the information processing system 402. Examples include, but are not limited to: microcode, device drivers, redundant processing units, external disk drive arrays, RAID systems, tape drives, and data archival storage systems.

Non-Limiting Embodiments

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit"," "module", or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for determining a sale price of an item via a smart price tag associated with the item, the computer-implemented method comprising:
    detecting the smart price tag as being shaken;
    sending a request for a current sale price of the item, in response to said detecting the smart price tag as being shaken;
    receiving the current sale price of the item for display, in response to said sending a request for a current sale price of the item;
    receiving a lock request from a consumer via a button on the smart price tag; and
    in response to receiving the lock request, locking the sale price of the item at the current sale price for a predetermined period of time.

2. The method of claim 1, further comprising displaying the current sale price for a predetermined period of time.

3. The method of claim 2, wherein the current sale price is displayed on at least one of the group consisting of: a display on the smart price tag and a separate display sign.

4. The method of claim 1, wherein the smart price tag is physically attached to the item, wherein an attachment is selected from the group consisting of a hook, a security pin, an adhesive, and a locking tag.

5. The method of claim 1, further comprising:
    determining that the smart price tag has been tampered with, in response to said detecting the smart price tag as being shaken; and
    deactivating the smart price tag, in response to said determining that the smart price tag has been tampered with.

6. The method of claim 1, further comprising clearing the current sale price upon expiration of a predetermined period of time.

7. The method of claim 1, wherein said receiving the lock request is determined to be associated with a press of a price lock button.

8. The method of claim 1, further comprising: receiving an unlock request prior to expiration of the predetermined period of time; and unlocking the sale price of the item.

9. The method of claim 1, further comprising determining that the predetermined period of time has expired; and unlocking the sale price of the item, in response to said determining that predetermined period of time has expired.

10. The method of claim 1, wherein the current sale price of the item is determined based on at least one of the group consisting of current supply of the item, current demand of the item, a given calendar day, a given time of year, a given season, a particular time of day, given crowd levels in a retail store, given online competition, given purchasing and warehousing costs, and given other expenses.

11. The method of claim 1, further comprising:
   determining a motion intensity of being shaken is greater than a predetermined threshold; and
   communicating an indication that the shaking is objectionable.

12. A smart price tag logically associated with an item for sale, the smart price tag comprising:
   a memory storing computer instructions;
   a sensor that detects the smart price tag is being shaken;
   a communication interface; and
   a processor, operably coupled with the memory, the sensor and the communication interface, the processor adapted to execute the computer instructions, comprising:
      detecting the smart price tag as being shaken:
         sending a request, via the communication interface, for a current sale price of the item, in response to said detecting the smart price tag as being shaken; and
         receiving the current price of the item for sale, in response to said sending a request for a current sale price of the item;
      receiving a lock request from a consumer via a button on the smart price tag; and
      in response to receiving the lock request, locking a sale price of the item at the current sale price for a predetermined period of time.

13. The smart price tag of claim 12, wherein the computer instructions further comprise instructions for displaying, the current price, in response to said receiving the current price of the item.

14. The smart price tag of claim 13, wherein the processor further clears the current sale price upon expiration of a predetermined period of time.

15. The smart price tag of claim 12, wherein the communication interface communicates using a protocol selected from the group consisting of a Wi-Fi protocol and a Bluetooth protocol.

16. The smart price tag of claim 12, further comprising a tamper sensor operably coupled with the processor such that the tamper sensor determines whether the smart price tag has been tampered with and responsive to determining that the smart price tag has been tampered with, the processor deactivates the smart price tag.

17. The smart price tag of claim 12, further comprising: a price unlock button, wherein upon detection of the price unlock button being pressed, the processor unlocks the sale price of the item.

18. The smart price tag of claim 12, wherein the processor further unlocks the sale price upon expiration of the predetermined period of time.

19. A non-transitory computer program product for determining a dynamic price of an item for sale via an attached smart price tag, the computer program product comprising:
   a computer readable storage medium storing instructions for execution by a computer for performing a method comprising:
   detecting the smart price tag as being shaken, the smart price tag logically associated with the item;
   sending a request from the smart tag for a current sale price of the item, wherein the request is associated with shaking the smart price tag;
   receiving the current sale price of the item for display, in response to said communicating a request for a current sale price of the it;
   receiving a lock request from a consumer via a button on the smart price tag; and
   in response to receiving the lock request, locking a sale price of the item at the current sale price for a predetermined period of time.

* * * * *